(12) United States Patent
Fullerton et al.

(10) Patent No.: US 8,180,996 B2
(45) Date of Patent: May 15, 2012

(54) DISTRIBUTED COMPUTING SYSTEM WITH UNIVERSAL ADDRESS SYSTEM AND METHOD

(75) Inventors: Mark Fullerton, Austin, TX (US); Barry Evans, Austin, TX (US)

(73) Assignee: Calxeda, Inc., Austin, TX (US)

( * ) Notice: Subject to any disclaimer, the term of this patent is extended or adjusted under 35 U.S.C. 154(b) by 314 days.

(21) Appl. No.: 12/466,996

(22) Filed: May 15, 2009

(65) Prior Publication Data

US 2009/0287902 A1    Nov. 19, 2009

Related U.S. Application Data

(60) Provisional application No. 61/053,527, filed on May 15, 2008, provisional application No. 61/053,522, filed on May 15, 2008.

(51) Int. Cl.
*G06F 12/06* (2006.01)

(52) U.S. Cl. .................. 711/206; 711/103; 711/203

(58) Field of Classification Search .................. 711/206, 711/103, 203, 114, E12.001, E12.008, 118, 711/145, 207
See application file for complete search history.

(56) References Cited

U.S. PATENT DOCUMENTS

| | | | | |
|---|---|---|---|---|
| 5,588,132 | A | * | 12/1996 | Cardoza ........................ 711/148 |
| 5,896,501 | A | * | 4/1999 | Ikeda et al. ................... 711/203 |
| 7,080,078 | B1 | | 7/2006 | Slaughter et al. |
| 2005/0015378 | A1 | | 1/2005 | Gammel et al. |
| 2006/0136570 | A1 | | 6/2006 | Pandya |
| 2006/0259734 | A1 | | 11/2006 | Sheu et al. |

OTHER PUBLICATIONS

PCT/US09/44200 International Search Report, dated Jul. 1, 2009.
PCT/ US09/44200 Written Opinion, dated Feb. 26, 2009.
PCT/US09/44200 International Preliminary Report on Patentability, dated Nov. 25, 2010.
PCT/US09/44200 Written Opinion, dated Jul. 1, 2009.

* cited by examiner

*Primary Examiner* — Thong Q Le
(74) *Attorney, Agent, or Firm* — DLA Piper LLP (US)

(57) ABSTRACT

A distributed computing system that incorporates enhanced distributed storage and a universal address system and method are provided.

25 Claims, 8 Drawing Sheets

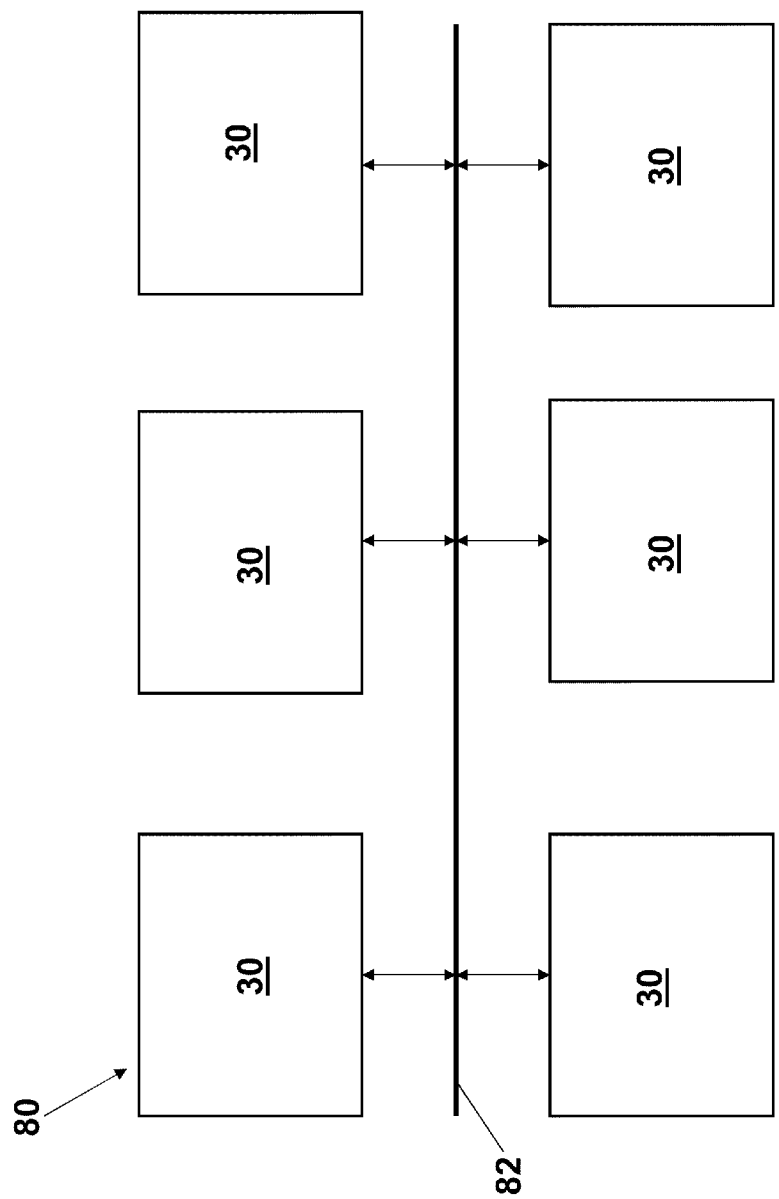

DISTRIBUTED COMPUTING SYSTEM WITH UNIVERSAL ADDRESS SYSTEM AND METHOD

PRIORITY CLAIMS/CROSS REFERENCE TO RELATED PATENT APPLICATIONS

This application claims the benefit under 35 USC 119(e) and priority under 35 USC 120 to U.S. Provisional Patent Application Ser. No. 61/053,527, filed on May 15, 2008 and entitled "Computing System with Universal Address System and Method" and U.S. Provisional Patent Application Ser. No. 61/053,522, filed May 15, 2008 and entitled "Distributed Computing System and Method", both of which are herein incorporated by reference.

FIELD

The system and method relate generally to a computer system and its architecture that includes distributed storage.

BACKGROUND

There are typically three major bottlenecks in any processing system: computation speed (the processor and how fast it processes data), memory access speed (the RAM) and access to storage (typically disc). Many solutions have been employed to resolve these issues over time, both for single processor systems and multiprocessor systems.

Thus, it is desirable to provide a distributed computing system and method that resolves these bottlenecks and it is to this end that the system and method are directed.

BRIEF DESCRIPTION OF THE DRAWINGS

FIG. 8 illustrates a distributed computer system.

DETAILED DESCRIPTION OF ONE OR MORE EMBODIMENTS

The system and method are particularly applicable to a server on a chip processing unit and system as described below and it is in this context that the universal address system and method are described. However, it will be appreciated that the universal address system and method has greater utility, such as to other computer systems and architectures that can utilize the universal address system and method. For example, the universal address system and method can be used with various processing unit based systems such as single processor systems in which it is desirable to overcome the above bottlenecks.

Figure 1:
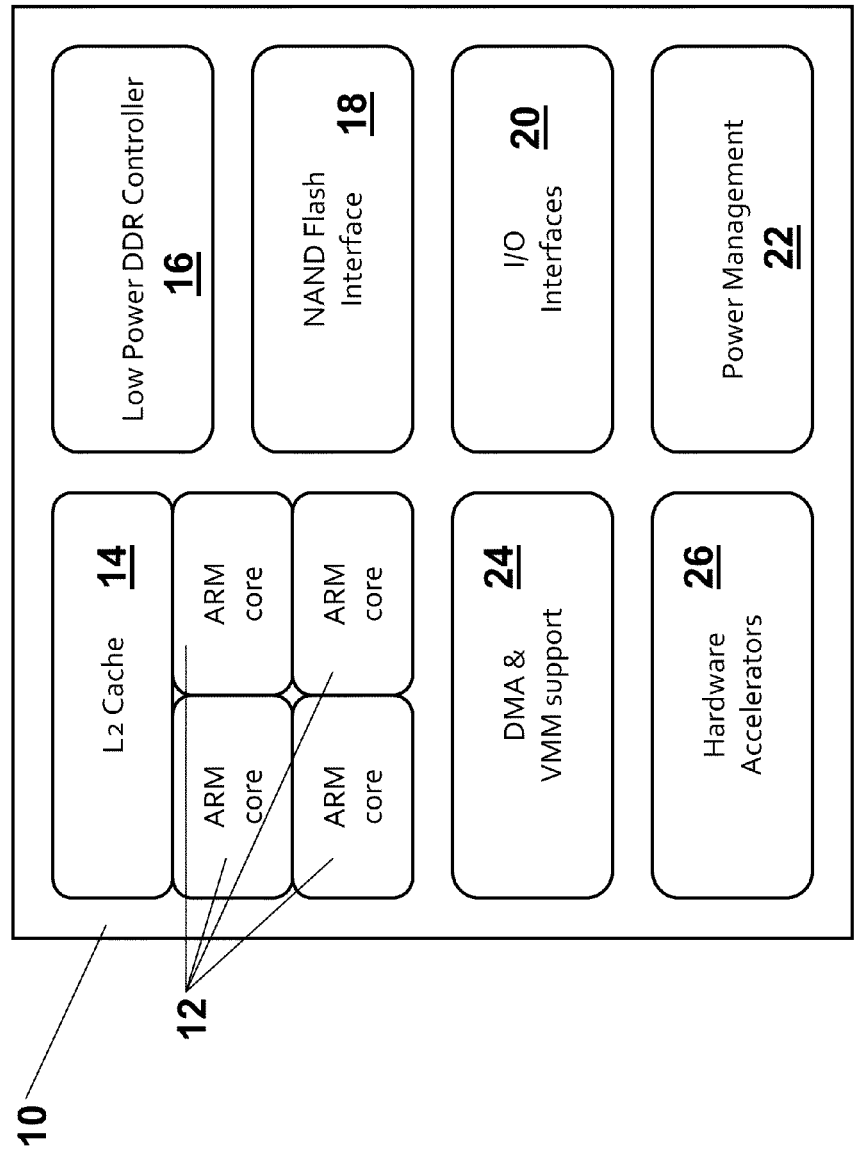
FIG. 1 illustrates a computing unit that may include a universal address system and method.

FIG. 1 illustrates a computing unit 10 that is part of a distributed computing system and may include a universal address system and method. In one embodiment, each computing unit may be implemented on a single integrated circuit as shown in FIG. 1. Each computing unit 10 may include one or more processing cores 12, such as ARM processing cores, and an associated cache memory 14, a low power DDR controller 16, a not AND logic (NAND) flash memory interface 18, I/O interfaces 20, a power management portion 22, a direct memory access (DMA)/virtual memory management (VMM) support unit 24 described in more detail below and one or more hardware accelerators 26.

Enhanced CPU Subsystem in a Symmetric Multi Processor Environment

Figure 7:
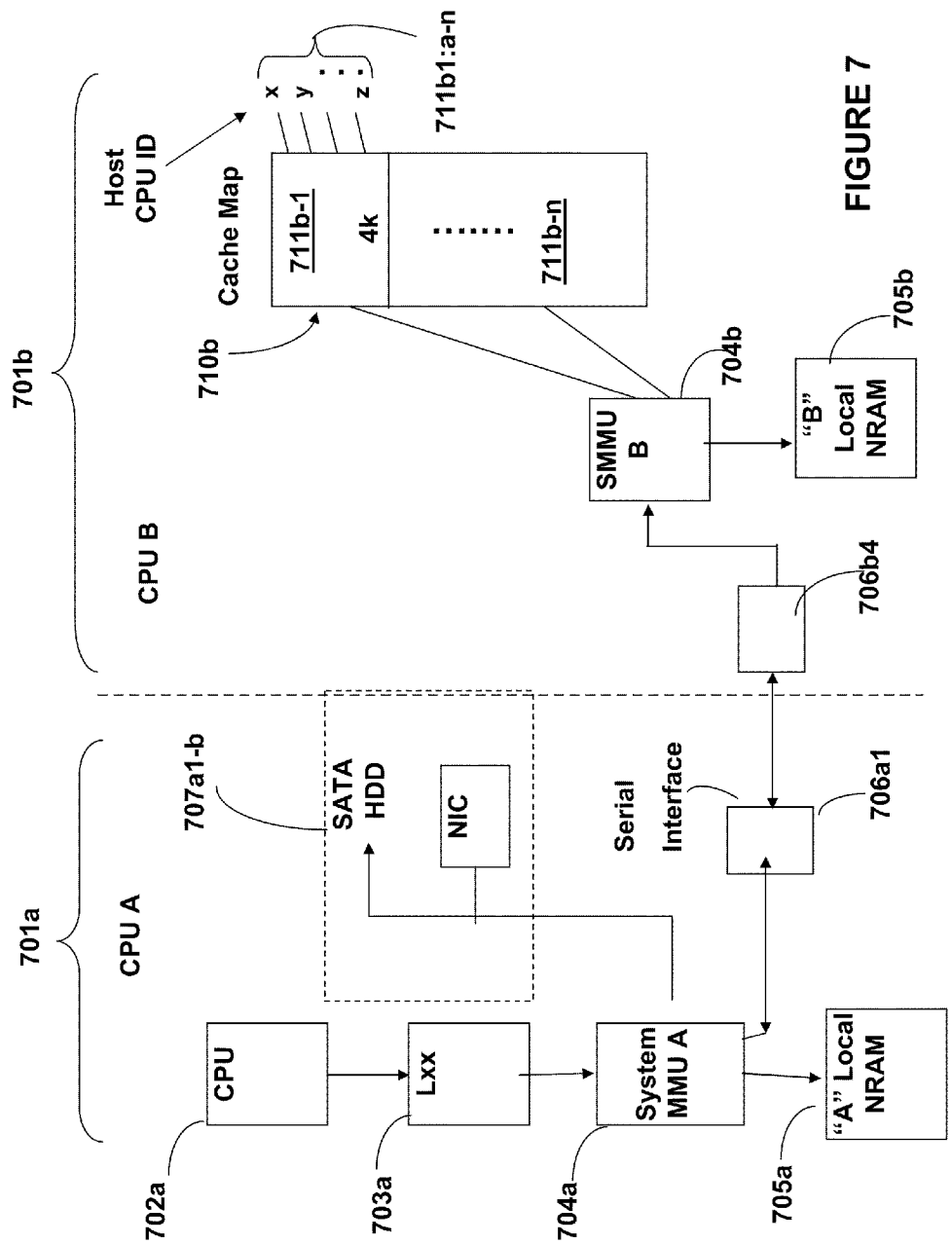
FIG. 7 illustrates an example of the universal address.

FIG. 7 shows an overview of an exemplary relationship of the memory system described below. In this example are two neighboring CPUs sections or sub-systems (CPUs), CPU section A 701a and CPU section B 701b, connected via their high-speed serial interfaces 706a1 and 706b4, which are typically onboard such systems. In other cases parallel interfaces may be used. Each CPU typically would have four such serial interfaces, although in other cases parallel interfaces may be used. If a CPU such as, for example, CPU 702a, is fetching a block of memory, it makes a request 703 to system memory manager SMMU 704a. This SMMU then looks up the location of the requested data and, based on the mechanisms described further below and throughout, determines whether said data resides in local (or locally controlled) memory 705a or in the memory 705b of the neighboring CPU 701b by inquiring to its SMMU 704b. The SMMU decides which CPU sections to inquire into to locate the requested block(s) by looking up the requested data block(s) in a Cache Map (CM) 710a (not shown in FIG. 7, but the cache map 710b for CPU B 701b is shown in FIG. 7.) If the requested block(s) are located in the other CPU, CPU 702a makes its request through the serial interfaces 706a1 and 706b4 into SMMU B 704b, which is the system memory management unit for CPU B 701b and SMMU B looks up the request.

Each SMMU has a local cache map (for clarity, only the cache map 710b is shown in FIG. 7) in which the SMMU can look up the requested block(s) and determine which host CPU ID maintains the current version of the block. If the requested block(s) have been widely distributed and read but not written back, the requested block(s) may actually be available in multiple CPUs and the SMMU can decide from what location to take the requested data block(s). On a chip with two or more CPUs, there may be a cascading look-up through the SMMUs of the CPUs to find the nearest or most easily accessible memory holding the desired data in its local memory (memory A 705a for CPU A and memory 705b for CPU B in the example shown in FIG. 7.)

FIG. 7 also shows local memory B 705b for CPU B, and various tags 711b1:a-n for the memory location for the sector 711b1. For example, the CPU B may have that block in its memory, but the block may no longer be valid due to trashing of the caching/memory system or some other problem. Also, the physical memory 705a and 705b may be dedicated physical memory, or in some cases, it may be sections of contiguous physical memory shared by all CPUs but controlled individually by different CPU sections. The local memories/physical memories/storage devices are referred to in the diagram as NRAM, but could be any one or a suitable combination of DRAM, NVRAM, NAND FLASH, NOR FLASH, static RAM with battery back up, etc. Depending on the type, for example for NAND FLASH or NOR FLASH, the SMMU needs to support the specific requirements to manage such types of memory, such as wear management, block size and fragmentation, etc., or refresh, etc., in the case of DRAM. Many variations can be made without departing from the spirit of the disclosure, for example, such that cascading look-up can find automatically the correct and current block in one or more out of a multitude of potential CPUs.

Thus, a multi processor system may have symmetric processors (processors such as CPU A and CPU B shown in FIG. 7 wherein each processor section has the same capabilities) communicating to their neighbors via high-speed communication ports (serial and/or parallel as described above), and each processor may have an adjacent memory controller (SMMU) capable of controlling local physical and global virtual memory, wherein the memory controller uses multiple levels of virtual memory to map distributed file systems into global and local memory sections.

A multi processor system, with symmetric processors communicating to their neighbors via high-speed communication ports, may have a search engine (that may be implemented in software or hardware) at the interface to each storage device/physical memory (implemented in FIG. 7 as a NAND or NOR part, but may also be DRAM) and can perform a comparison at the full data rate of the device. In some implementations, the search engine may reside on a storage device side of the interface or on a system side of the interface for the storage device. In other implementations, the search engine may reside on the storage device side of the interface or on the system side of the interface for the storage device, and the search engine may provide mechanisms (that may be implemented in software methods or hardware devices) to filter the stream of data which is retrieved from the flash (for example, by removing all but matching records from a data base file). The search engine may receive a search request from various interfaces and in various formats. For example, one or more processor/CPU section(s) may be connected directly to an Ethernet network/cable so that the search engine can receive Ethernet frames as a lookup request and the perform the search in the memory associated with the one or more processor/CPU section(s).

In other implementations, hardware is used to allow the distributed files systems to be accessed via table walking (as VM), thus allowing simple hardware to support, as discussed throughout this document in various aspects of the MMU and or related hardware. In addition, the virtual to physical address translation may produce multiple possible options for the requested block(s) since the virtual address may map to two or more different physical addresses wherein the actual physical address to read the requested block(s) from may be chosen based on parameters describing attributes of each memory address such as connectivity and cost, or chosen randomly to allow interleaving. In yet other cases, both the file system as well as computation of location and the memory may be distributed across a system, at times with all processor running a single instance of the operating system (OS), and at other times with not all processors running a single instance of the OS.

Figure 2:
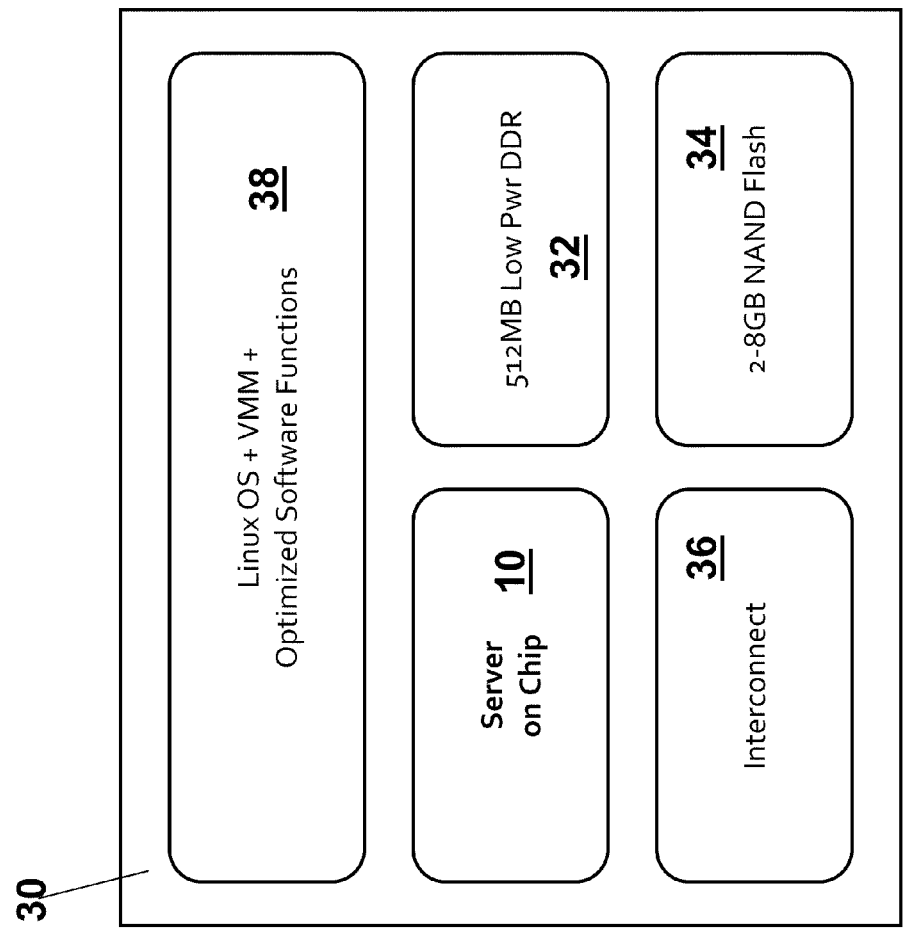
FIG. 2 illustrates a computing system that may include a universal address system and method.

FIG. 2 illustrates a distributed computing system 30 that may include a universal address system and method. Each computing system 30 may be a node in a processing system in which a plurality of nodes are connected to each other over a link, such as a network. In addition to the computing unit 10, each computing system 30 may further comprise double data rate (DDR) low power RAM 32, such as 512 Mb of low power DDR RAM in one embodiment, which is direct access memory to the computing system, NAND flash memory 34, such as 2-8 Gb of NAND flash memory in one embodiment, that acts as persistent storage and stores a file system, an interconnect 36 that connects this computing system to the other computing systems over a link, such as a computer network, and software 38, such as a Linux operating system, virtual memory management (VMM) software and one or more optimized software functions. In one embodiment, the universal address system is implemented using the DMA and VMM support 24 of each computing unit 24 (See FIG. 1) in combination with the VMM software 38 (shown in FIG. 2). The DMA of the computing unit is a standard mechanism (common in many systems) which can be given a data movement task to perform by the system. In this scenario such a standard module would be told to copy a page of data via the IO links to the local memory and then to report. The VMM support is a similarly standard function consisting of both software and hardware which is used to check every memory access and convert the virtual page to a physical page reference. In this scenario we would use the existing mechanisms as the first level of the extended mechanism and use the VMM software to further translate from local physical page to universal address. Now, the universal address system and method are described in more detail.

Figure 3:
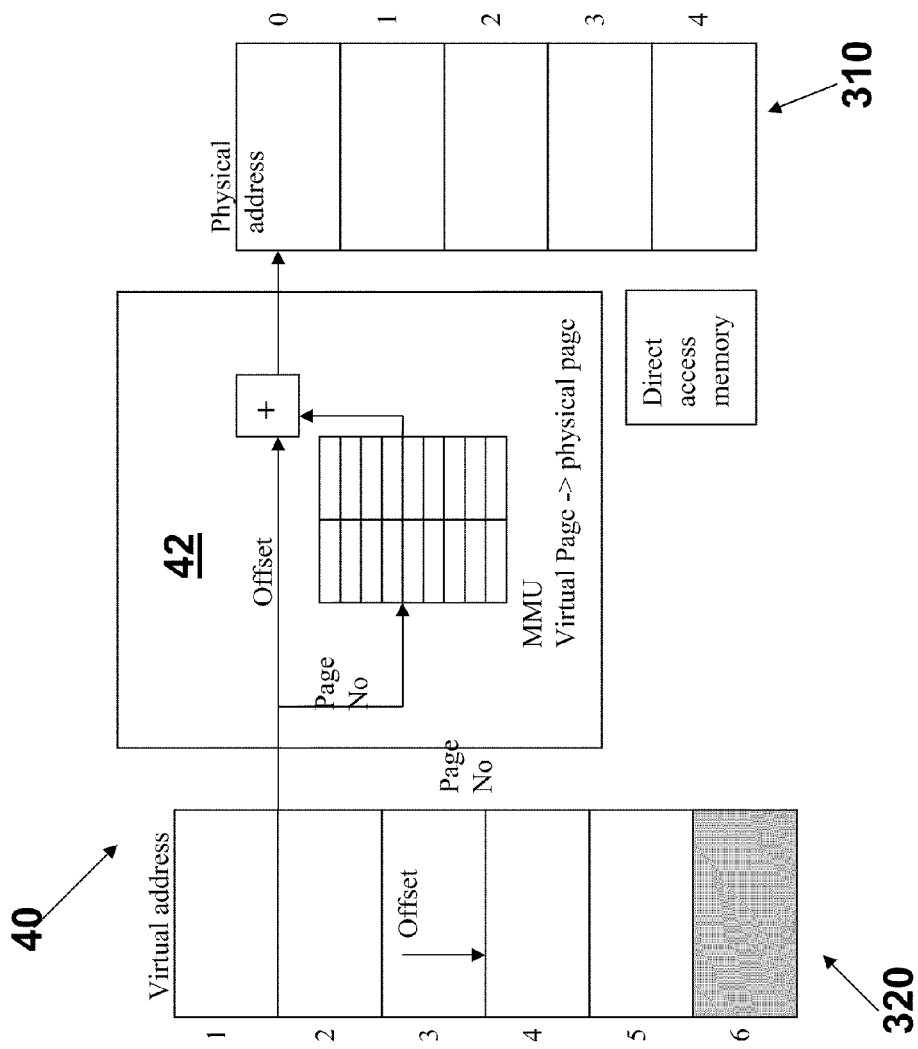
FIG. 3 illustrates a virtual memory to physical mapping.

FIG. 3 illustrates a virtual memory to physical mapping. As described above, each computing system 30 may be a node in a system made up of a large number of processing nodes connected by a network and each computing system 30 is a self-contained computation engine containing one or more processors and two kinds of memory including direct access memory (i.e. RAM), and persistent storage (i.e. file system).

In such a system, each processor (in any kind of system although the computing system 30 is being used for illustration purposes) has a physical memory range (which is implemented as direct access memory) into which virtual pages are placed (logically there is a virtual-to-physical mapping 40 as shown in FIG. 3). It is quite common for some of the virtual address range 320 to be absent from the real physical space but instead to be held in persistent storage. Thus the virtual address space of a processor can be sparse and only partly populated or be partly held in real physical address space and partly in file system (aka swap space). Within a processor, a set of memory management unit (MMU) tables 42 maintain the representation between the virtual address space and the physical address space and also indicate when a virtual address is mapped to persistent storage (although in general actually finding the location in persistent storage is not managed here but somewhere in the rest of the system). The MMU tables 42 also maintain permissions, indicating who is allowed to access a particular address range and in what manner in physical memory address range 310.

Figure 4:
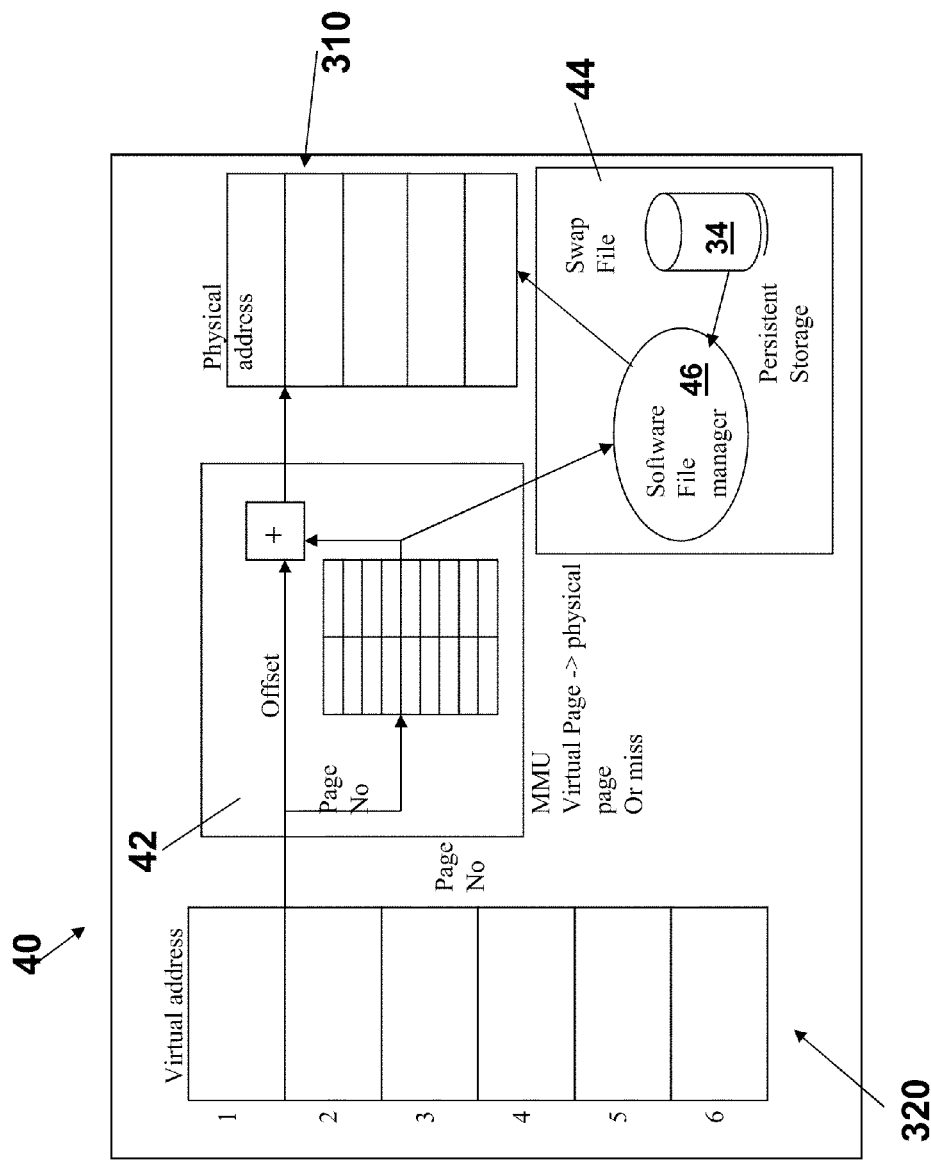
FIG. 4 illustrates a virtual memory showing the position of a swap space.

FIG. 4 illustrates a virtual memory showing the position of a swap space 44. The swap space can therefore be defined as a chunk of persistent storage (here used because of its lower cost and greater size than direct access memory) which is used to store the contents of some virtual address space which cannot fit into real direct access memory. The swap space may include the persistent storage device 34 that interacts with a file manager 46, such as a software implemented file manager in one embodiment, to achieve the swap space. The software file manager communicates with the MMU tables 42 and the persistent storage 34 to provide swap files. In many cases, it is very efficient for a processing node to use the VMU system to access data as it is much more efficient than using the file system. It is common practice to map files into the virtual memory. These files are called memory mapped files. These files are allocated to take large contiguous sections of the Virtual memory space and are thus mapped into physical memory and (presumably, as there is no reason usually to stop it) into virtual memory which is held in storage. Thus an odd kind of mapping can be considered where a file is mapped into memory which is in turn mapped into storage (aka swap space).

Multi Processing

In a typical multiprocessor processing node running one instance of an operating system (OS), there is one instance of the OS and there is only one virtual memory space shared by the multiple processors within the node so that everything is mapped into one memory space and the entire memory space is visible to each processor in the node through the VMM. Apart from the fact that (1) there are multiple processors running, and (2) low level cache coherency among the processors, this is not materially different from the case of the single processor processing node as far as operation of the memory system.

Each Node has its Own OS

When two processing nodes in a system with each node running its own instance of an operating system, each node can communicate with the other through soft messages, similar in nature to a cluster. As each node has its own operating system, each node also has its own virtual memory space, and also its own file system. For one node to access the memory or file system of the other, a message must be sent and interpreted by the other node. Typically, mechanisms such as MPI or PVM are used to handle this communication. It is common practice to access the file system on other nodes via the model of having a different disc for each node and accessing another node's disk (in reality sending a message to the other system asking it to perform a disk access on our behalf and return the data).

1:1 Mapping

Generally virtual memory forms a 1:1 mapping of pages where a single virtual page maps onto a single physical page. Its is possible in some architectures for multiple virtual pages to map onto a single physical page (N:1) often via indirection (in this scenario for example, a single global, or system-wide page is mapped into multiple nodes' local memory spaces). Here however we are going to consider a 1:N mapping where the same virtual address can be mapped onto one of several identical physical pages (or as we will see later copies of a file). Although this is generally possible it can be considered to be useful in the case where those identical pages are located in different spaces and the cost of access to each of them differs. For example one page may be on a local node, the next might be on a distant node which is very heavily loaded and the third might be on a node which is very lightly loaded and next door in terms of routing cost.

In this scenario when we access a memory location the MMU will return a list of options for memory rather than just one, some weighting function is then applied to this list and one option is selected. The weighting function might include cost of access (i.e. how far across the network in terms of latency and available bandwidth), permissions (read only or R/W) etc. It should be clear that there are different properties associated with each entry.

Weighting Functions

The use of the weighting function may be used to determine which of the possible copies to actually use is a key concept in this approach. While the actual function to be used will depend on the system details it needs to take into account several different general concepts including:

Locality: It will clearly be more efficient to source the data (or write the data) to a local memory rather than to one on a remote node.

Permission: like entries in a cache pages can have different properties, for example one page could be in the process of being updated. Thus an access "for write" might be different from a read access. It will be required that each page maintain an associated state in order to allow the correct operation of the system (a standard cache protocol such as Moesi or MESI should work adequately).

Routing cost: the cost of transferring the data across the network should figure, clearly something which requires one hop is more desirable than something which requires several.

Node utilization: clearly some nodes in a system will be busier than others, it would be very attractive if access to a popular page was shared between different machines rather than all concentrated on one node.

File System Only Accessible Via Virtual Memory

A system can have a file system in persistent storage which is always mapped into virtual memory before being accessed and the operating system would automatically map the file system into a large area of its virtual memory map and configure it so that any access to that persistent storage would automatically cause a copy in from persistent storage to direct access memory which would then be mapped to the virtual memory space. This structure is different from the use of a swap file to hold virtual pages which we have no room for in direct access memory, in this case we are using the concept of the memory mapped file, we are "pretending" to load the whole file system into virtual memory but not actually going ahead and doing the load until the section of the file is accessed.

Now logically it could be considered this a "double mapping" case where a single virtual page mapped to a persistent storage element AND to a direct access memory copy (each with different properties) however it might be that the software simply doesn't work this way and it likes to move file data into and out of VM space in a different manner. To accomplish this, it is desirable to have a way of referring to the actual physical location of the file in persistent storage as well as the copy of it in direct access memory so that we can assign cost-of-access-parameters to the weighting functions. The direct access memory copy can be referred to as the physical address. A new address term called the "file address" similarly identifies the block address location in the persistent storage medium of the file.

The system may have two address spaces which map to real physical items including:

1) the physical address which refers to direct access memory, and

2) The storage address.

Figure 5:
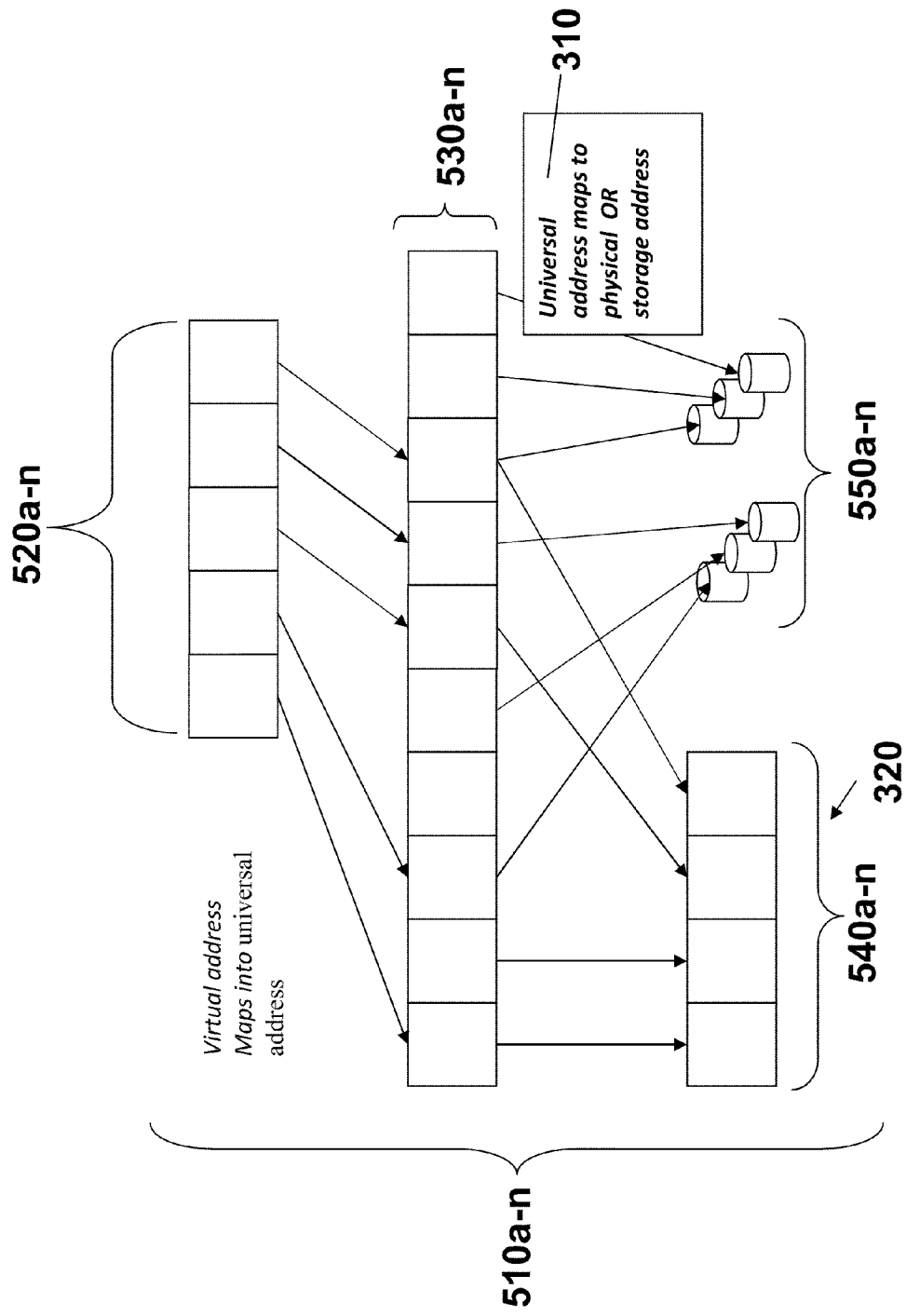
FIGS. 5 and 6 illustrate a virtual to universal to storage and physical system.

In all real file systems this storage address does exist at some level and represents the mapping of the file system to the physical sectors and blocks on the disc. It can be considered therefore that a file system really operates in a way similar to the MMU and VMM and manages the mapping between "virtual" files $530x$ to "physical addresses, as shown in FIG. 5.

In an ideal world this mapping of storage into virtual memory could be done simply, but unfortunately, come processors are limited in addressable virtual memory space to 4 Gigabytes, which is very low for file systems. Hence in order to make this work, a "universal memory" $520x$ space is created into which the file system is mapped. An access to this universal memory is thus translated into a list of results which can refer either to a persistent storage address (section of file system) $550x$ OR to an area of physical memory $540x$ OR to both. A universal address can therefore map onto a physical address or a storage address as shown in FIG. 5.

Multiple Nodes and Universal Memory System

In a system comprised of multiple processing nodes, such as a cluster, it would be desirable to access the data stored in different nodes of the system in a relatively simple manner. For files this could be done by referring to the file via a unique identifier but it would be more desirable to make use of a memory mapped copy of the file present somewhere in the system if one existed, and to have some efficient way of directing a requesting node to access the node where the file exists.

Using the idea of mapping a file into virtual memory and pointing to where it resides (either on disk (storage address) or in direct access memory (physical address), the system can refer to files in terms of where they reside. So, each node has a unique identifier and a unique address can be generated for the filestore by taking the node number and combining it with the address within the file system (i.e. the storage address). A similar mechanism can be created for the physical memory by combining the physical address and the node number which provides a way of referring to each real memory resource in the system.

Figure 6:
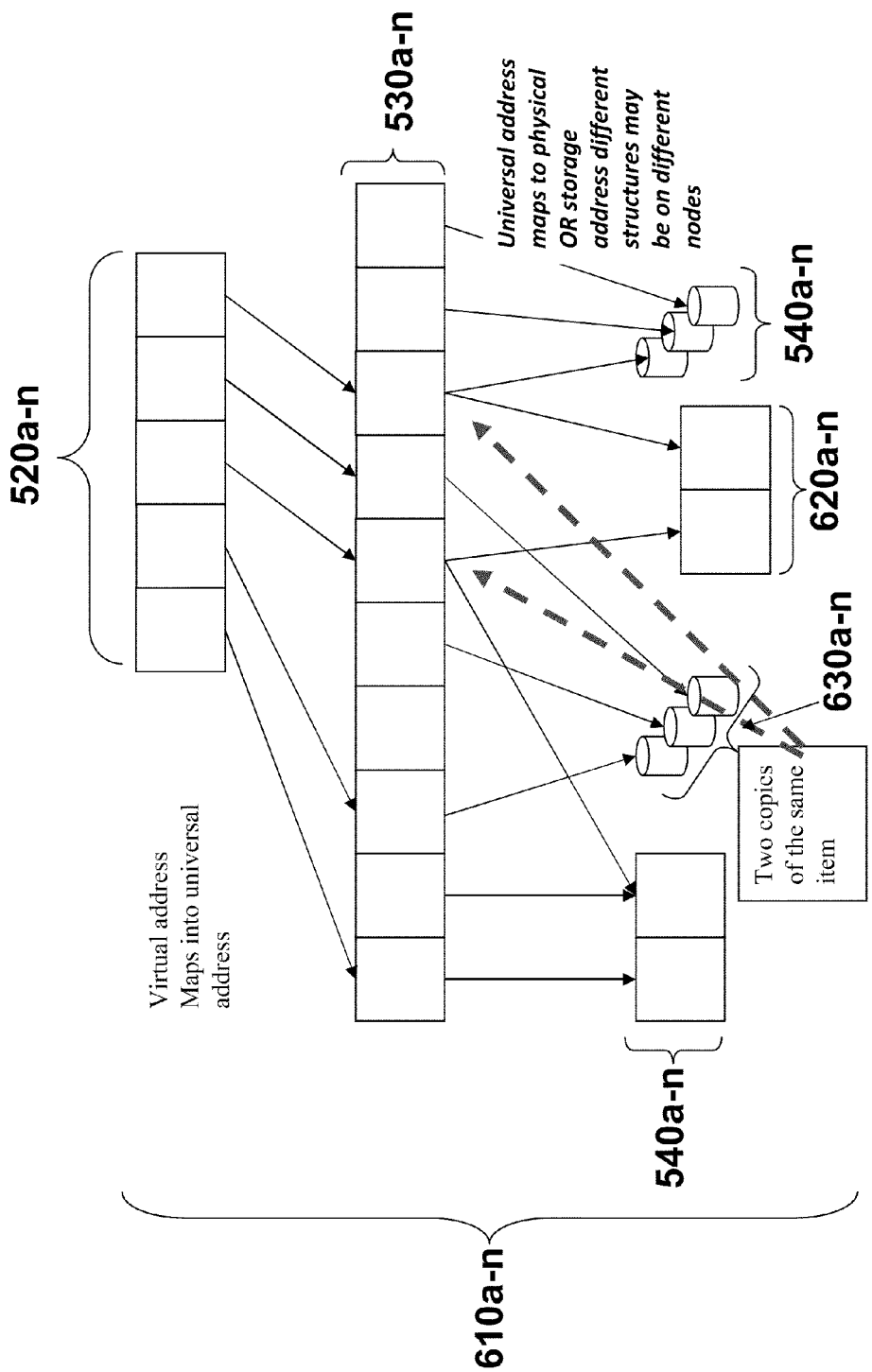

As shown in FIG. 6, the one or more processing cores 12 may be associated with the TBL/MMU (memory management unit) 42 that manages the universal address space. During a memory access, the one or more processing units may reference an address, such as 10FFD+xxx which means Page10FFD plus offset xxx which is a virtual address since it does not refer to a physical or storage address. In the system, the virtual address is translated via the TLB/MMU 42 associated the one or more processing cores 12 to a "local" physical address, to a universal address or to a non mapped block. Local physical addresses are copies of pages in the universal address range which are already present in the particular local node. A universal address reference is a link to a system resource (e.g., a piece of a file store) which we do not have a local copy of yet. A non mapped block is typically an error case (or a signal to increase memory allocation to a particular task). Then, as shown, the universal address maps onto multiple copies of global physical address which will consist of a list of memory and physical storage elements which are intended to be identical. In other words, the universal address maps to a physical or storage address different structures may be on different nodes. As shown in FIG. 6, two different universal addresses may have copies of the same item.

In summary, within a system there are multiple pages (or blocks) of data each with a unique identifier. Each page within each node and each storage block within each node has a single identifier which uniquely points to it. This set of addresses which uniquely identify each physical block of data is called the global physical address. This relationship is shown in FIG. 7.

In the system, all of the unique memory addresses across all nodes reside in universal memory, and are mapped into a system-wide table we will call the universal memory map. The universal memory map is comprised of pages; each page being identified by a universal address. Each universal page is a unique entity which may have multiple copies throughout the system (or may have no instances). The universal memory map has a table identifying each universal page and providing pointers to the storage addresses and physical addresses which contain the actual data. This is not a 1:1 relationship as many copies of the same data can be held in many places. Thus, a universal page refers to a distinct set of data, which can reside in multiple address locations across multiple nodes. However, multiple copies of the same data set are referred to by a single universal address. A universal address denotes both the data set, and provides pointers to the multiple locations at which the data set could be accessed. These locations are storage addresses and physical addresses. Software can chose to access any suitable copy of the universal address as they are logically identical. This table is therefore a persistent item as it shows the mapping of storage addresses to universal address. Physical addresses are not persistent but should be removed from the mapping as the system is powered down or as the direct access memory is reallocated.

It is important to realize that while physical addresses may be pointed to by universal addresses (i.e. copies of file store loaded into direct access memory) there is no need for all physical address to be pointed to by universal address, this is not true for storage addresses as all occupied (and even unoccupied as the reallocation system should use the same mechanism) *is* mapped by the universal address.

Virtual to Universal

When a processing node wishes to access some file system, it attempts to map it into its local virtual memory space. Initially this mapping misses and software creates a memory space in the virtual space to contain this file. This virtual space is linked to the space in the universal address space which contains the file. Note that by definition each possible file location in the system must have a storage address. A universal address exists for ALL storage addresses (even for initialized ones). When a file item is updated (e.g. deleted or created) then the old universal address will be removed and a new universal address assigned (this may either be a completely new address or an existing address if the file is a copy). It is unlikely that it would be implemented this way but for understanding it may be possible to consider that all "empty" storage addresses in the system are pointed to by the same universal address as they are all copies of the "null". If a file is merely updated then the universal address will not change but it will be marked "dirty" and all other copies in the system will need to be updated.

When the virtual memory is accessed the table is walked to a universal address. This universal address is then walked to find a list of possible sources. This is the key of the whole system: having these multiple sources enables us to fetch the data from wherever is most attractive. Message operations are sent to pull the data from the selected location. These messages are directed at the destination node which is part of the universal address, and are accesses either to physical or storage addresses. This is handled by hardware. Quite often a copy of the memory block might be created in local memory and a new pointer added to the universal address. Subsequently although the universal address has to be checked the file data can be fetched directly via the local copy.

Virtual addresses can be mapped to local physical addresses without any overhead as normal. In this circumstance no one else can reference the block. If the block is to be visible to multiple devices then it should be mapped via a Universal address. When a virtual address is accessed which is indirected to a universal address then it is required to synchronize this access via the whole system (to ensure that no changes are happening to the address at another location). Normally this would require a global synchronizing event which would be visible to all nodes but using one of the common cache protocols e.g. MOESI and marking the state of the universal address this can often be avoided and a simple update can be carried out.

Miss

If the universal address represents a miss (i.e. no reference is given), then an error has occurred as all file systems of all processing nodes are mapped in their entirety. In order to ensure that some transient element is not occurring, a request is sent to all nodes via a global and synchronizing message. This process will ensure that all earlier items have completed if all nodes respond OK. At this point, the tables are checked again. A repeat miss represents a real system error.

Error

If a processing node finds an error, cannot reply, or a message gets lost, then a timeout occurs. Next, the originator attempts to access another copy of the data. Thus a copy of the data may be discarded and an advisory sent out to indicate this so that the system can recover from the error.

This is a mechanism which allows references to file systems, which may exist somewhere within a cluster of processing nodes, to be mapped so that processing nodes can find data resident in file systems of other processing nodes in the system. It is distributed in that there is no central directory and can cope with duplication—multiple copies for redundancy and performance. It intrinsically maps data from file store into memory allowing high performance file systems. The translation mechanism can be run in hardware rather than requiring software which adds to performance. In addition, all memory can be regarded as a files system of some kind, real RAM (e.g., stack is mapped onto a special file system).

FIG. 8 illustrates a distributed computer system 80 that has one or more computing systems 30 that are interconnected to each other over a link 82, such as a computer network. The distributed computer system is a multiprocessor system and each computing system may be a node or processing element of that multiprocessing system. As shown in FIG. 2 above, each node has its own RAM (the 512 MB low power DDR), but may also share memory with the other nodes in the multiprocessing system. The multiprocessing system solves the bottleneck of computation speed (by providing the multiple computing system each of which has one or more processing cores) and the bottleneck of memory access speed by distributing the memory interface over multiple memory blocks to provide quicker access to the memory.

For a fine grain parallel system (with many small processing nodes are used) such as shown in FIGS. 1, 2, and 8, it is impractical to have shared large storage as the amount of logic and cabling and the physical size of each disc element is too large to be combined with each node. In conventional system uses a single shared I/O disc (multiple copies for redundancy and performance are also possible) is provided for each set of processing nodes.

With the advent of significant solid state storage systems (i.e. NAND flash or NOR flash) the restrictions on distributing storage through a fine grain system are reduced. In particular, as shown in FIG. 2, it is practical to have a significant amount of storage wherever RAM memory is employed (since NAND flash is denser than DRAM meaning that more storage space is provided by flash than for the same physical amount of DRAM.) It is therefore practical to imagine new architectures where ALL of the compute engines in the system are connected both to data store and normal memory as shown in FIG. 2. In the system shown in FIG. 2, every processing node 30 has its own local storage 34 as shown in FIG. 2. Thus a search engine is specifically intended to perform processing at the full data rate of a storage device in order to preprocess data in some configured manner that is advantageous for following processes (either from a throughput point of view—there being many such devices—or from a utilization point of view, the data being reduced to be manageable by the following system). In some cases, such a compute engine may be used to secure (decrypt or encrypt) a file in a highly secure device, thus only allowing files which are "allowed" based on presentation of credentials to the device as a security feature. In other cases, such a compute engine could be used embedded in solid state memory cards, or could be added to the reading circuitry within a disc drive.

This kind of architecture is particularly suited for the so called embarrassingly parallel problems (e.g. data mining) where the system is bottlenecked on the connect to storage (often fixed by loading the contents of the storage into local memory in each node). A system where each storage element has its own processing/search node to allow heavy parallelism can have great value in some applications. Many existing supercomputer implementations, such as the Kittyhawk project at IBM, still complain about the storage bottleneck)

The distributed system and distributed storage provides a multiprocessor system where each processing node has a file system attached to it and is implemented in either NAND or NOR flash. The distributed system further provides a search engine where a node is provided at the interface to each NAND/NOR part and can perform a comparison at the full data rate of the device. Furthermore, the search engine can be integrated into the Flash device (or into the controller for the flash device) and provides mechanisms to filter the stream of data which is retrieved from the flash (for example removing all but matching records from a data base file). In addition, a compute engine (node) is provided that is specifically intended to perform processing at the full data rate of a storage device in order to preprocess data in some configured manner which is advantageous for following processes (either from a throughput point of view—there being many such devices or from a utilization point of view, the data being reduced to be manageable by the following system.)

The distributed system may also be applied in solid state memory cards or could be added to the platters within a disc drive.

In summary, the universal address system provides for the use of multiple levels of virtual memory to map distributed file systems into memory. The system also provides hardware mechanism to allow the distributed file systems to be accessed via table walking (as virtual memory (VM)), thus allowing simple hardware support. The universal address system also provides virtual to physical address translation producing multiple possible options which can be either chosen based on parameters describing attributes of each memory address such as connectivity and cost, or chosen randomly to allow interleaving. The universal address system also provides a file system as well as computation and memory that is distributed across a system (which may or may not be running a single instance of the OS).

While the foregoing has been with reference to a particular embodiment of the invention, it will be appreciated by those skilled in the art that changes in this embodiment may be made without departing from the principles and spirit of the disclosure, the scope of which is defined by the appended claims.

We claim:

1. A multi processor system, comprising:
a first processor section integrated circuit having a first processing unit, a first memory controller coupled to the first processor unit, a first high speed communication port and a memory local to the first processor section that is coupled to the first memory controller;
a second processor section integrated circuit adjacent the first processor section integrated circuit, the second processor section having a second processing unit and a second memory controller coupled to the second processor unit, a memory local to the second processor section that is coupled to the second memory controller and a second high speed communication port, wherein the first processor section and second processor section communicate with each other using the first and second high speed communication ports; and
the first memory controller and the second memory controller each being capable of controlling memories local to the respective memory controller and a global virtual memory, wherein first memory controller and the second memory controller each uses multiple levels of virtual memory to map a file system into global virtual memory and the memories local to the respective memory controllers.

2. The system of claim 1 further comprising a piece of hardware that allows the distributed file system to be accessed using table walking.

3. The system of claim 1, wherein the first memory controller and the second memory controller each further comprise one or more tables that map a plurality of locations in a virtual address space to a plurality of locations in a physical address space wherein the physical address space further comprises a plurality of locations in the memories local to the respective memory controllers and a plurality of locations in the file system, wherein the one or more tables have a selected virtual address that maps to a plurality of physical addresses and wherein the first processing unit chooses a physical address for the selected virtual address based on an attribute of a particular physical address or randomly.

4. The system of claim 1, wherein the file system is distributed across the first processor section and the second processor section.

5. The system of claim 4, wherein the first processing unit and the second processing unit each execute a single instance of an operating system.

6. The system of claim 4, wherein the first processing unit executes a first instance of an operating system and the second processing unit executes a different instance of the operating system.

7. A multiprocessor system, comprising:
a first processor node having a first processing unit, a first file system coupled to the first memory controller and a first high speed communication port;
a second processor node adjacent the first processor node, the second processor node having a second processing unit, a second file system coupled to the second memory controller and a second high speed communication port, wherein the first processor node and second processor node communicate with each other using the first and second high speed communication ports; and
wherein the first and second file systems each further comprise NAND flash memory.

8. The system of claim 7, wherein first processor node further comprises a system memory management unit coupled to the first processing unit and the first file system and wherein the second processor node further comprises a system memory management unit coupled to the second processing unit and the second file system.

9. A multiprocessor system, comprising:
a first processor node having a first processing unit and a first file system coupled to the first processor node and a first high speed communication port;
a second processor node adjacent the first processor node, the second processor node having a second processing unit and a second file system coupled to the second processor node and a second high speed communication port, wherein the first processor node and second processor node communicate with each other using the first and second high speed communication ports; and
wherein the first and second file systems each further comprise NOR flash memory.

10. The system of claim 9, wherein first processor node further comprises a system memory management unit coupled to the first processing unit and the first file system and wherein the second processor node further comprises a system memory management unit coupled to the second processing unit and the second file system.

11. A multiprocessor system, comprising:
a first processor node having a first processing unit, a first file system coupled to the first processor node and a first high speed communication port;
a second processor node adjacent the first processor node, the second processor node having a second processing unit, a second file system coupled to the second processor node and a second high speed communication port, wherein the first processor node and second processor node communicate with each other using the first and second high speed communication ports; and
wherein the first and second file systems each further comprise one of a NOR flash memory and a NAND flash memory and a search engine on an interface between the respective file system and the respective processor node, wherein the search engine performs a comparison at a full data rate of the file system.

12. The system of claim 11, wherein the interface further comprises a file system side and a processor node side and wherein the search engine is located on one of the file system side of the interface and the processor node side of the interface.

13. The system of claim 12, wherein the search engine further comprises a mechanism that filters data retrieved from the file system.

14. The system of 11, wherein the search engine receives a search request in one or more different formats wherein the search request is received over one or more different interfaces.

15. The system of claim 11, wherein the search request is an Ethernet frame received over an Ethernet interface.

16. A multiprocessor system, comprising:
a first processor node having a first processing unit, a first file system coupled to the first processor node and a first high speed communication port;
a second processor node adjacent the first processor node, the second processor node having a second processing unit, a second file system coupled to the second processor node and a second high speed communication port, wherein the first processor node and second processor node communicate with each other using the first and second high speed communication ports; and
wherein the first and second file systems each further comprise one or more dynamic random access memories and a search engine on an interface between the respective file system and the respective processor node, wherein the search engine performs a comparison at a full data rate of the file system.

17. The system of claim 16, wherein the interface further comprises a file system side and a processor node side and wherein the search engine is located on one of the file system side of the interface and the processor node side of the interface.

18. The system of claim 17, wherein the search engine further comprises a mechanism that filters data retrieved from the file system.

19. The system of 16, wherein the search engine receives a search request in one or more different formats wherein the search request is received over one or more different interfaces.

20. The system of claim 16, wherein the search request is an Ethernet frame received over an Ethernet interface.

21. A computing unit, comprising:
a processing unit in the computing unit;
a storage device on the computing unit that is coupled to the processing unit;

a high speed communication port on the computing unit that is coupled to the processing unit and capable of coupling the computing unit to one or more adjacent processing units wherein the computing unit and the one or more adjacent processing units are capable of communicating with each other using the high speed communication ports; and wherein the storage device further comprises a compute engine on an interface of the storage device that pre-processes data from the storage device at the full data rate of the storage device.

22. The computing unit of claim 21, wherein the compute engine secures a file stored in the storage device based on a set of credentials.

23. The computing unit of claim 22, wherein the compute engine encrypts or decrypts the file stored in the storage device based on a set of credentials.

24. The computing unit of claim 21, wherein the storage device further comprises a solid state memory card and wherein the compute engine is embedded into the solid state memory card.

25. The computing unit of claim 21, wherein the storage device further comprises a disc drive having a read circuit and wherein the compute engine is embedded into the read circuit of the disc drive.

* * * * *